US010971750B2

(12) United States Patent
Ju et al.

(10) Patent No.: US 10,971,750 B2
(45) Date of Patent: Apr. 6, 2021

(54) MULTI-CELL TAB CUTTING APPARATUS AND METHOD THEREFOR

(71) Applicant: SK INNOVATION CO., LTD., Seoul (KR)

(72) Inventors: Seung Hoon Ju, Daejeon (KR); Kwan Yong Kim, Daejeon (KR); Ji Hoon Lim, Daejeon (KR); Eun Jeong Choi, Daejeon (KR); Gyu Jin Chung, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 0 days.

(21) Appl. No.: 15/946,545

(22) Filed: Apr. 5, 2018

(65) Prior Publication Data
US 2018/0294505 A1    Oct. 11, 2018

(30) Foreign Application Priority Data

Apr. 6, 2017 (KR) .................. 10-2017-0044643

(51) Int. Cl.
| | |
|---|---|
| *H01M 10/04* | (2006.01) |
| *B26D 1/08* | (2006.01) |
| *H01M 2/30* | (2006.01) |
| *B26D 7/01* | (2006.01) |
| *B26D 1/58* | (2006.01) |

(52) U.S. Cl.
CPC ........ *H01M 10/0404* (2013.01); *B26D 1/085* (2013.01); *B26D 7/01* (2013.01); *H01M 2/30* (2013.01); *B26D 1/58* (2013.01); *H01M 2220/20* (2013.01)

(58) Field of Classification Search
CPC ...... B23D 7/04; H01M 4/04; H01M 10/0404; B26D 7/01; B26D 7/016; B26D 1/04; B26D 1/045; B26D 7/015; B26D 7/0006; B26D 1/085; Y10T 83/7587; Y10T 83/7573
See application file for complete search history.

(56) References Cited

U.S. PATENT DOCUMENTS

| | | | | |
|---|---|---|---|---|
| 2,628,680 A | * | 2/1953 | Seybold ................ | B26D 7/016 83/416 |
| 3,118,334 A | * | 1/1964 | Blaha .................... | B23D 15/06 83/76.5 |
| 3,738,504 A | * | 6/1973 | Vail ....................... | B26D 7/016 414/19 |

(Continued)

FOREIGN PATENT DOCUMENTS

| | | | |
|---|---|---|---|
| CN | 205600003 U | 9/2016 | |
| DE | 1114164 B * | 9/1961 | ............. B26D 7/016 |

(Continued)

OTHER PUBLICATIONS

Office Action issued by the CNIPA dated Aug. 10, 2020.

*Primary Examiner* — Jennifer B Swinney
(74) *Attorney, Agent, or Firm* — IP & T Group LLP

(57) ABSTRACT

Disclosed herein are a multi-cell tab cutting apparatus for a plurality of cells, which have a plurality of tabs formed at one side, and a method therefor. The multi-cell tab cutting apparatus includes a base frame, a cell tab fixer connected to the base frame and configured to fix and support the plurality of tabs, and a cutter positioned at the base frame and configured to cut the plurality of tabs through driving.

12 Claims, 5 Drawing Sheets

(56) References Cited

U.S. PATENT DOCUMENTS

| | | | | |
|---|---|---|---|---|
| 3,961,858 | A * | 6/1976 | Smith | B23B 51/0406 |
| | | | | 408/204 |
| 5,375,492 | A * | 12/1994 | Smitterberg | B26D 1/02 |
| | | | | 83/13 |
| 5,630,898 | A * | 5/1997 | Judkins | B26D 1/09 |
| | | | | 156/197 |
| 7,926,154 | B2 | 4/2011 | Hong et al. | |
| 8,361,647 | B2 * | 1/2013 | Zhao | H01M 10/0413 |
| | | | | 429/158 |
| 9,808,949 | B2 * | 11/2017 | Hori | B26D 1/08 |
| 2006/0088761 | A1 * | 4/2006 | Ota | B60L 58/21 |
| | | | | 429/130 |
| 2012/0121967 | A1 * | 5/2012 | Nakamura | H01M 2/026 |
| | | | | 429/163 |
| 2013/0189569 | A1 * | 7/2013 | Youm | H01M 10/04 |
| | | | | 429/185 |
| 2015/0183121 | A1 * | 7/2015 | Hsu | B27B 11/02 |
| | | | | 83/466.1 |

FOREIGN PATENT DOCUMENTS

| | | | | |
|---|---|---|---|---|
| EP | 2123412 A1 * | 11/2009 | | B26D 7/016 |
| KR | 101337226 | 12/2013 | | |
| WO | 2013/180449 A1 | 5/2013 | | |

* cited by examiner

MULTI-CELL TAB CUTTING APPARATUS AND METHOD THEREFOR

CROSS-REFERENCE TO RELATED APPLICATION

This application claims priority to and the benefit of Korean Patent Application No. 10-2017-0044643, filed on Apr. 6, 2017, the disclosure of which is incorporated herein by reference in its entirety.

BACKGROUND

1. Field

Embodiments of the present disclosure relate to a multi-cell tab cutting apparatus and a method therefor, which are capable of improving working speed and minimizing a tolerance between a plurality of tabs being cut by stacking a plurality of cells, fixing the plurality of tabs formed at one side or both sides of the plurality of cells, and cutting the plurality of tabs at a time through once driving of the apparatus.

2. Discussion of Related Art

Owing to technological developments and demands for electric vehicles, hybrid electric vehicles, and the like are rapidly growing, demands for electric vehicle batteries are also rapidly increasing, and various countries are speeding up development and production of batteries.

Meanwhile, since these electric vehicle batteries require high output and large capacity, a middle- or large-sized battery module in which tabs formed at a plurality of battery cells are electrically connected is used and many companies are showing increasing interest in improving the production speed and quality of the above-described battery module.

Conventionally, however, only a single tab can be cut at a time when tabs of cells are cut for inter-cell connection such that there are problems in that working time is excessively required and tolerances in the tab cutting process are accumulated, causing degradation in quality such as an electrical disconnection between the cells when the tabs are welded.

In order to resolve the above-described problems, a new tab cutting technique is required, and specifically, it is needed for development of a multi-cell tab cutting technique capable of cutting a plurality of tabs at a time through once driving by stacking cells and fixing the plurality of tabs so as to minimize a tolerance between the plurality of tabs in the process of manufacturing a battery module.

SUMMARY

Embodiments of the present disclosure are directed to provide a multi-cell tab cutting apparatus and a method therefor, which are capable of fixing a plurality of tabs through a cell tab fixer to minimize motion of the plurality of tabs and cutting the plurality of tabs of a plurality of stacked cells at a time through once driving.

Further, embodiments of the present disclosure are directed to provide a multi-cell tab cutting apparatus and a method therefor, wherein a plurality of tabs are fixed to two mutually spaced cell tab fixers and are sequentially cut by a cutting blade.

Furthermore, embodiments of the present disclosure are directed to provide a multi-cell tab cutting apparatus and a method therefor, wherein a plurality of tabs are simultaneously cut by a cutting member having a plurality of cutting recesses through once driving.

Moreover, embodiments of the present disclosure are directed to provide a multi-cell tab cutting apparatus and a method therefor, wherein a cutter and a cell tab fixer can be transferred by a transferer and be spaced apart from stacked cells and the stacked cells can be easily separated and transferred after a plurality of tabs are cut.

In addition, embodiments of the present disclosure are directed to provide a multi-cell tab cutting apparatus and a method therefor, wherein two cutters and two cell tab fixers can be disposed, and a plurality of tabs can be cut at one side or both sides of stacked cells according to positions of the plurality of tabs formed at the stacked cells.

Additionally, embodiments of the present disclosure are directed to provide a multi-cell tab cutting apparatus and a method therefor, which are capable of simultaneously or sequentially cutting a plurality of tabs at both sides of stacked cells.

According to one aspect of the present disclosure, there is provided a multi-cell tab cutting apparatus for a plurality of cells, which have a plurality of tabs formed at one side, the apparatus including a base frame, at least one cell tab fixer connected to the base frame and configured to fix and support the plurality of tabs, and at least one cutter positioned at the base frame and configured to cut the plurality of tabs through driving.

The apparatus may further include a slider configured to rectilinearly drive the cutter.

The apparatus may further include a cell fixer configured to fix a cell body included in each of the plurality of cells to the base frame.

A plurality of fixing recesses may be formed at the cell tab fixer.

The cell tab fixer may include a first fixer and a second fixer which are spaced apart from each other.

The cutter may include a cutting blade at one side, and the cutting blade may be inserted into a space between the first fixer and the second fixer to sequentially cut the plurality of tabs in a predetermined direction.

The cutter may include a cutting member having a plurality of cutting recesses formed thereat, and the plurality of tabs may be located at the plurality of cutting recesses and be simultaneously cut by the plurality of cutting recesses during driving of the cutting member.

The apparatus may further include a transferer configured to transfer the cutter and the cell tab fixer.

A plurality of tabs may be formed at both sides of the plurality of cells, and at least two cutters and at least two cell tab fixers may be located at each of both sides of the plurality of cells.

The cutter cuts the plurality of tabs through once driving.

The two cutters may be simultaneously driven.

The two cutters may be sequentially driven.

According to another aspect of the present disclosure, there is provided a multi-cell tab cutting method including stacking a plurality of cells, confining and fixing a plurality of tabs at one sides of the plurality of stacked cells by at least one cell tab fixer, and cutting the plurality of fixed tabs through driving of at least one cutter.

The method may further include fixing gaps between the plurality of stacked cells by an adhesive member.

The method may further include fixing a cell body of each of the plurality of stacked cells by a cell fixer.

The method may further include sequentially cutting the plurality of tabs in a predetermined direction.

The method may further include simultaneously cutting the plurality of tabs by a plurality of cutting recesses formed at a cutting member of the cutter.

The method may further include transferring the cell tab fixer and the cutter to approach toward the plurality of stacked cells or to separate from the plurality of stacked cells.

A plurality of tabs may be formed at the other sides of the plurality of stacked cells, and the cutting of the plurality of tabs may be performed at both sides of the plurality of stacked cells.

The method may further include simultaneously driving the cutters at both sides of the plurality of stacked cells.

The method may further include sequentially driving the cutters at both sides of the plurality of stacked cells.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, specific embodiments of the present disclosure will be described with reference to the accompanying drawings. However, these are merely illustrative embodiments, and the present disclosure is not limited thereto.

In the following description of the present disclosure, if a detailed description of the known related art is determined to obscure the gist of the present disclosure, the detailed description thereof will be omitted. Further, all terms used hereinafter are defined by considering functions in the present disclosure, and meanings thereof may be different according to a user, the intent of an operator, or custom. Therefore, the definitions of the terms used herein should follow contexts disclosed herein.

The technical spirit of the present disclosure is determined by the appended claims, and embodiments described hereinafter are merely a means for efficiently describing the technical spirit of the present disclosure to those skilled in the art to which the present disclosure pertains.

Figure 1:
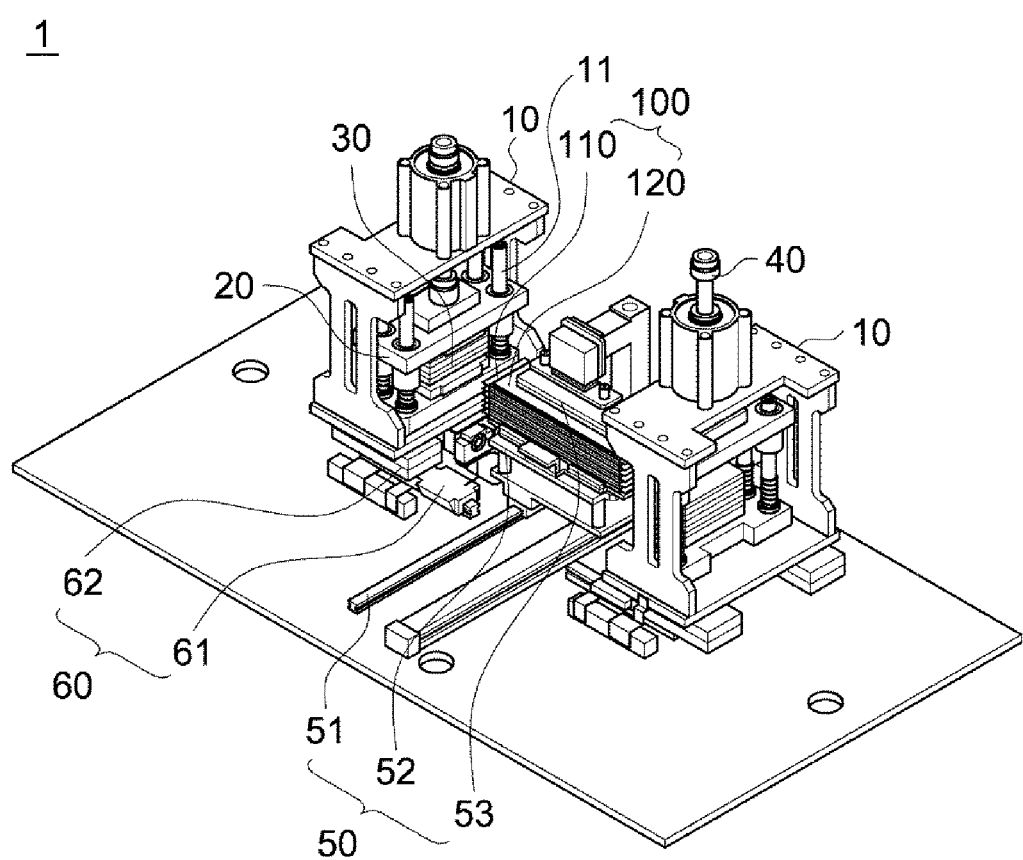
FIG. 1 is a perspective view of a multi-cell tab cutting apparatus according to an embodiment of the present disclosure.

FIG. 1 is a perspective view of a multi-cell tab cutting apparatus according to an embodiment of the present disclosure.

Referring to FIG. 1, in a multi-cell tab cutting apparatus 1 for a plurality of cells 100, each of which has a plurality tabs 110 formed at at least one side, the multi-cell tab cutting apparatus 1 may include a base frame 10, a cell tab fixer 30 connected to the base frame 10 and having a plurality of fixing recesses 33 configured to fix and support the plurality of tabs 110, a cutter 20 formed at the base frame 10 and configured to cut the plurality of tabs 110 by once driving, and a slider 40 configured to rectilinearly drive the cutter 20.

At this point, the plurality of tabs 110 may be formed at only one sides of the plurality of cells 100, and alternatively, the plurality of tabs 110 may also be formed on the other sides of the plurality of cells 100, and in this case, a single tab 110 may be formed at both sides of each of the plurality of cells 100. Further, the once driving for the cutter 20 configured to cut the plurality of tabs 110 is not limited to the rectilinear movement, and any driving may be employed as long as it is capable of driving the cutter 20 to cut a specific object through a rotational movement and the like in addition to the rectilinear movement.

Furthermore, the cell tab fixer 30 may be formed by stacking a plurality of blocks, and a block may be added or separated corresponding to the number of the plurality of tabs 110 fixed to the cell tab fixer 30, such that a height of the cell tab fixer 30 and the number of the plurality of fixing recesses 33 may be determined.

For example, when three cells 100 are stacked, four or more blocks may be stacked at the cell tab fixer 30 so as to fix three tabs 110 such that three or more fixing recesses 33 may be formed. Similarly, when four tabs 110 are cut, five or more blocks may be stacked at the cell tab fixer 30 to form four or more fixing recesses 33, such that a height of the cell tab fixer 30 may be determined according to the number of stacked blocks.

As described above, in the cell tab fixer 30 according to the embodiment of the present disclosure, since the height of the cell tab fixer 30 and the number of the fixing recesses 33 may be varied according to the number of stacked cells 100, even when the number of tabs 110, which will be cut, is varied, the number of blocks of the cell tab fixer 30 may be varied and be used immediately for the cutting process.

Meanwhile, the multi-cell tab cutting apparatus 1 according to the embodiment of the present disclosure may further include a cell fixer 50, and each of the plurality of cells 100 may include a cell body 120. The plurality of cells 100 may be bonded and fixed to each other by an adhesive member such as a double-sided tape or a tape while the plurality of cells 100 are stacked, but the present disclosure is not limited thereto, and any method may be employed as long as it is capable of bonding a plurality of stacked cells 100 to each other.

Further, the cell body 120 of each of the stacked cells 100 may be vertically pressurized by the cell fixer 50 and thus a position of the cell body 120 may be fixed. At this point, the cell fixer 50 may include a first gripper 52 and a second gripper 53, at least one of the first gripper 52 and the second gripper 53 may be vertically moved to form a space in which the stacked cells 100 are able to be seated, and the plurality of stacked cells 100 being seated may be pressurized and fixed by the first gripper 52 and the second gripper 53.

However, since a pouch (not shown) or the like in which each of the plurality of stacked cells 100 is packed may be damaged while the plurality of stacked cells 100 are pressurized, a buffer (not shown) such as a sponge or the like may be attached on a surface of the cell fixer 50, which is brought into close contact with the plurality of stacked cells 100, or the plurality of stacked cells 100 may be fixed and protected by a hard case (not shown). Further, the fixing of the cell fixer 50 is not limited to pressurization, and the fixing may include various methods capable of preventing vibration and motion of the plurality of stacked cells 100 by forming a support (not shown) at a side surface of the plurality of stacked cells 100 or covering a case (not shown) surrounding the cell body 120 may be applied.

Figure 2:
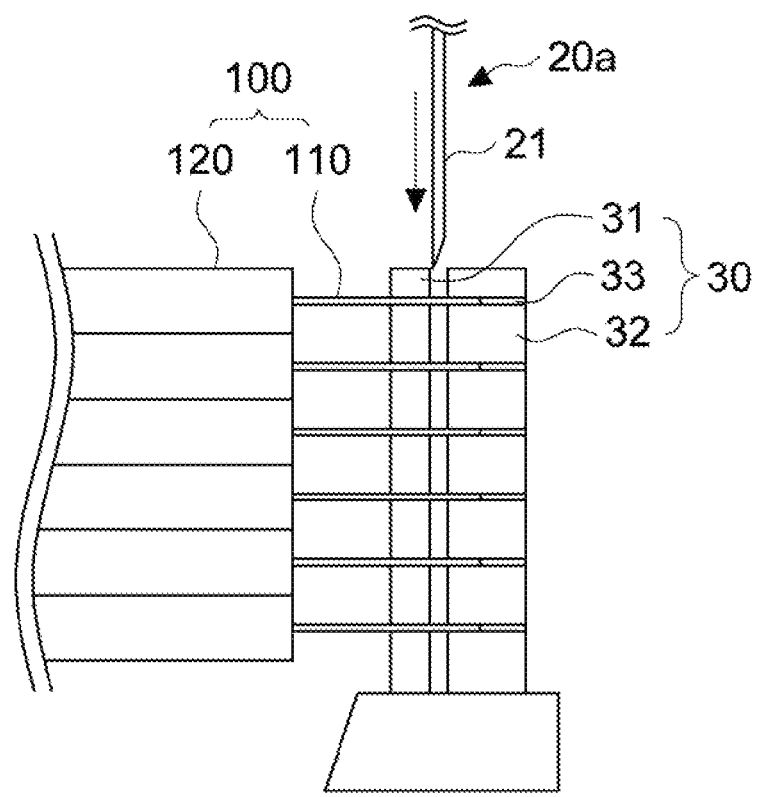
FIG. 2 is a diagram illustrating a case in which a plurality of tabs on one side of stacked cells are sequentially cut by a cutter according to a first embodiment of the present disclosure with respect to the cutter.

After the plurality of cells 100 are stacked, the tab 110 formed at each of the plurality of cells 100 may be fixed by the cell tab fixer 30. At this point, the plurality of fixing recesses 33 corresponding to the plurality of tabs 110 may be formed at a side surface of the cell tab fixer 30 (the plurality of fixing recesses 33 are shown in FIG. 2). The plurality of tabs 110 are inserted into the plurality of fixing recesses 33 at the cell tab fixer 30 and each of the plurality of tabs 110 inserted into the plurality of fixing recesses 33 is fixed and supported in the vertical direction such that vibration and motion of the plurality of tabs 110 may be minimized.

Accordingly, a cut length of each of the plurality of tabs 110 may be kept constant in a cutting process of the plurality of tabs 110, which will be described below, and a tolerance between the plurality of tabs 110 may be minimized such that quality of a battery module (not shown) including the plurality of cut tabs 110 can be significantly improved.

Meanwhile, the plurality of fixing recesses 33 may be formed on only one side of the cell tab fixer 30 or be formed to pass through the cell tab fixer 30, and the fixing is not limited thereto and may be modified within an equivalent scope of the present disclosure such as fixing of the plurality of tabs 110 at left and right sides that are parallel to the ground.

Further, the plurality of tabs 110 may be formed at both sides of the plurality of cells 100, and two cutters 20 and two cell tab fixers 30 may be formed at both sides of the plurality of cells 100. At this point, each of the two cutters 20 and each of the two cell tab fixers 30 are located at one of both sides of the plurality of cells 100 to cut the plurality of tabs 110 at both sides of the plurality of cells 100. Meanwhile, the two cutters 20 may be simultaneously driven at the same time, and alternatively, the two cutters 20 may be sequentially driven at both sides of the plurality of cells 100.

Further, the multi-cell tab cutting apparatus 1 according to the embodiment of the present disclosure may further include a transferer 60 configured to transfer the base frame 10 at which the cutter 20 and the cell tab fixer 30 are formed, and a cell transferer 51 configured to transfer the cell fixer 50. At this point, the transferer 60 may include a guide rail 61 and a guide block 62 configured to be movable along the guide rail 61, but the present disclosure is not limited thereto, and any method may be employed as long as it is capable of transferring the base frame 10 parallel to the ground. A driving method of the cell transferer 51 is the same as that of the transferer 60, and thus a detailed description thereof will be omitted.

Thus, since the cutter 20 and the cell tab fixer 30 are transferred by the transferer 60, the plurality of tabs 110 may be located at the plurality of fixing recesses 33 of the cell tab fixer 30 and at a plurality of cutting recesses 23 of FIG. 3, which will be described below, while the plurality of tabs 110 are cut. Further, the plurality of cells 100 stacked after the cutting process may be spaced apart from the cutter 20 and the cell tab fixer 30 by the transferer 60 and the cell transferer 51, such that a space for separating the plurality of stacked cells 100 and stacking a plurality of new cells 100 may be secured.

FIG. 2 is a diagram illustrating a case in which the plurality of tabs 110 on one sides of the stacked cells 100 are sequentially cut by the cutter 20*a* according to a first embodiment of the present disclosure with respect to the cutter 20.

Referring to FIG. 2, a cell tab fixer 30 may include a first fixer 31 and a second fixer 32 which are spaced apart from each other and at which a plurality of fixing recesses 33 are formed, and the first fixer 31 and the second fixer 32 are spaced apart from each other to form a predetermined space. Further, a cutter 20*a* may include a cutting blade 21 at one side, and the cutting blade 21 may be inserted into the space formed between the first fixer 31 and the second fixer 32.

Meanwhile, the plurality of tabs 110 may be fixed to the plurality of fixing recesses 33 of the first fixer 31 and the second fixer 32 when cut, and the cutter 20*a* configured to be vertically driven may be moved down by a slider 40 constituted with a piston (not shown) and a slide (not shown) such that the plurality of tabs 110 may be sequentially cut from a top side.

At this point, the space between the first fixer 31 and the second fixer 32 may be formed to have a size suitable for the cutting blade 21 to properly fit thereinto so as to minimize a cutting error. Further, the cutting blade 21 is not limited to a blade configured to cut an object and may be replaced with other cutting methods such as laser cutting, oxygen cutting, and the like. Furthermore, the slider 40 is not limited to being driven by the slide and the piston, and the slide and the piston may be modified into equivalents capable of performing a linear driving, such as a rack, a pinion gear or a cam, a link structure, and the like.

Figure 3:
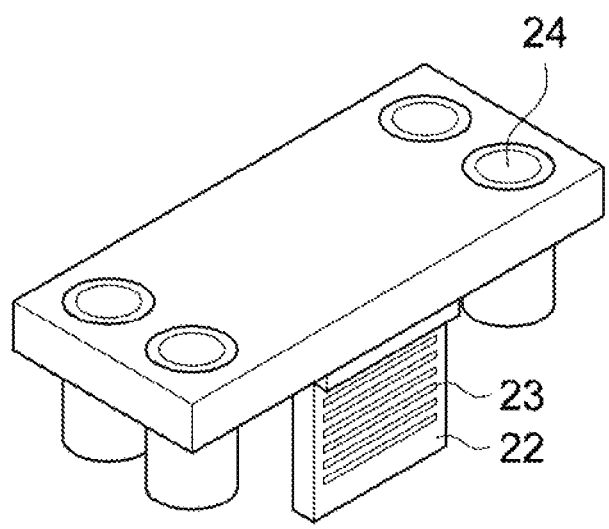
FIG. 3 is a perspective view of a cutter according to a second embodiment of the present disclosure with respect to the cutter.

FIG. 3 is a perspective view of a cutter 20*b* according to a second embodiment of the present disclosure with respect to the cutter 20. In FIG. 2, the plurality of tabs 110 are sequentially cut by the cutter 20*a* according to the first embodiment of the present disclosure with respect to the cutter 20, but in FIG. 3, a case in which a plurality of tabs 110 are simultaneously cut by the cutter 20*b* according to the second embodiment of the present disclosure with respect to the cutter 20 will be described.

Referring to FIG. 3, the cutter 20*b* may include a cutting member 22 at which a plurality of cutting recesses 23 are formed. At this point, the plurality of cutting recesses 23 of the cutting member 22 may be formed parallel to each other at regular intervals by corresponding to the plurality of tabs 110, and a cutting edge (not shown) may be formed at an interior of each of the plurality of cutting recesses 23 to easily cut the plurality of tabs 110.

Further, at least one guide hole 24 configured to be movable along a guide shaft 11 of a base frame 10 may be formed at both sides of the cutter 20*b*. Motion of the cutter 20*b* may be minimized when the cutter 20*b* is vertically driven through the guide shaft 11 and the guide hole 24 such that each of the plurality of tabs 110 may be cut in a constant length.

Figure 4:
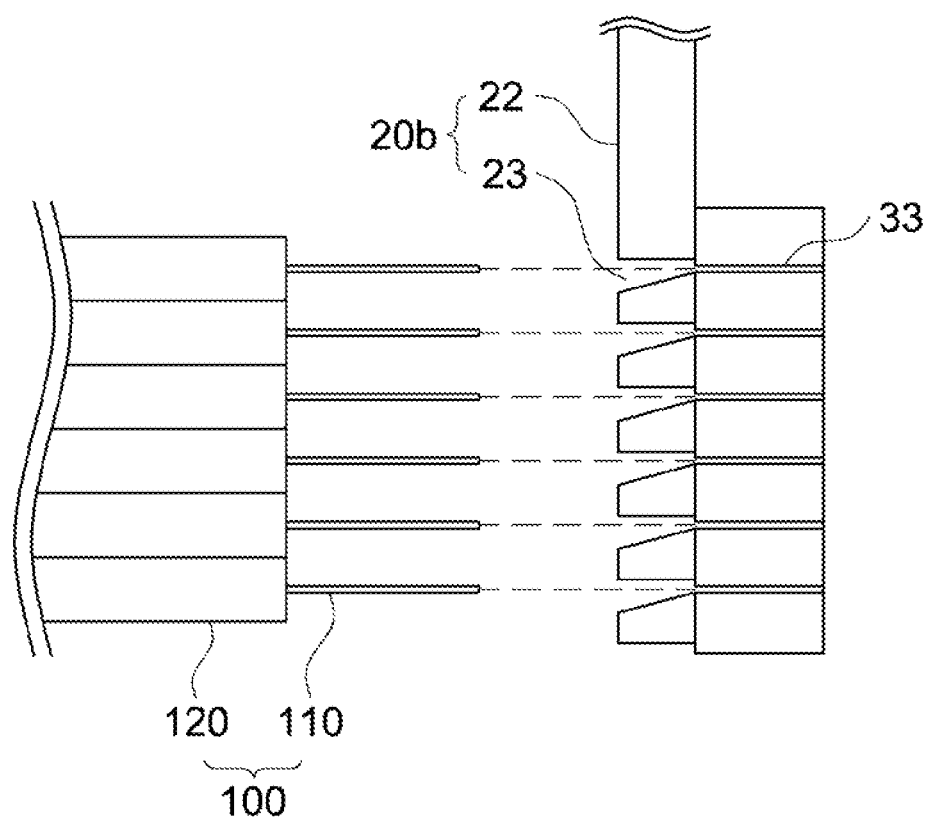
FIG. 4 is a diagram illustrating a case in which each of a plurality of tabs, each of a plurality of cutting recesses of a cutting member, and each of a plurality of recesses of a cell tab fixer are positioned on a straight line according to the second embodiment of the present disclosure with respect to the cutter.
Figure 5:
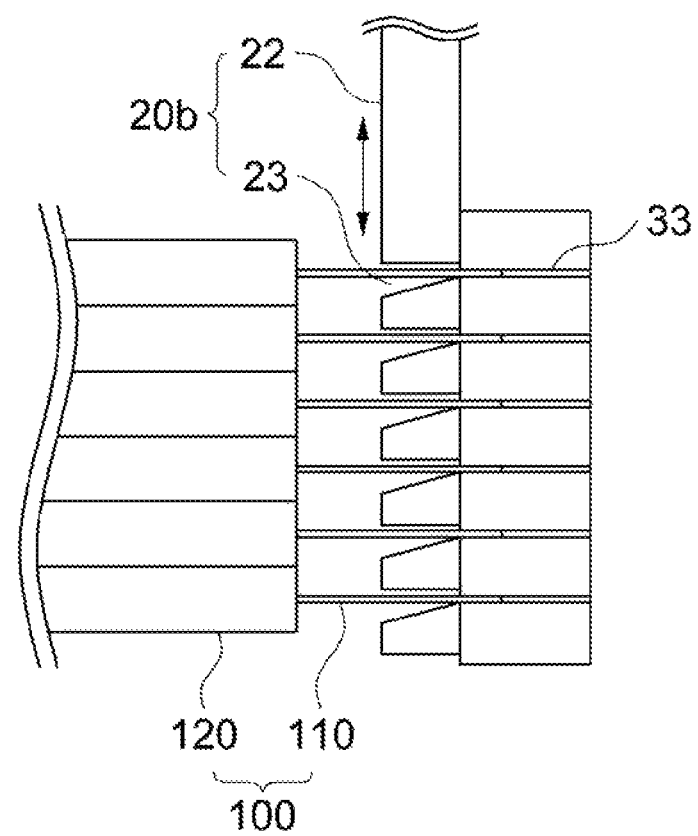
FIG. 5 is a diagram illustrating a case in which a plurality of tabs located at the cutting recesses of the cutting member are simultaneously cut by the cutter according to the second embodiment of the present disclosure with respect to the cutter.

FIG. 4 is a diagram illustrating a case in which each of a plurality of tabs 110, each of a plurality of cutting recesses 23 of a cutting member 22, and each of a plurality of recesses 33 of the cell tab fixer 30 are disposed on a straight line according to the second embodiment of the present disclosure with respect to a cutter 20, and FIG. 5 is a diagram illustrating a case in which a plurality of tabs 110 disposed at a plurality of cutting recesses 23 of a cutting member 22 are simultaneously cut according to the second embodiment of the present disclosure with respect to the cutter 20.

Referring to FIGS. 4 and 5, the plurality of tabs 110, the plurality of cutting recesses 23 of the cutting member 22, and the plurality of fixing recesses 33 of the cell tab fixer 30 may correspond to one another and may be disposed on a straight line, and the cutting member 22 and the cell tab fixer 30 may be transferred by the above-described transferer 60 such that the plurality of tabs 110 may be inserted into the plurality of cutting recesses 23 and the plurality of fixing recesses 33.

At this point, the plurality of tabs 110 may be simultaneously cut through once driving of the cutting member 22 by the slider 40, and specifically, the plurality of tabs 110 may be simultaneously cut by the cutting edge formed at each of the plurality of cutting recesses 23.

As described above, since the plurality of tabs 110 are cut at the same position and under the same condition, the cells may secure the plurality of tabs 110 having the same length. Further, tolerances accumulated during the cutting of a plurality of individual cells as in the related art can be reduced through a single cutting process, so that a tolerance between the plurality of tabs 110 can be minimized, and a welding error and a defective rate of a battery module can be reduced in a subsequent electrical bonding process between the plurality of tabs 110, such as welding with a bus bar, such that production efficiency and quality can be significantly improved.

Furthermore, even when the plurality of tabs 110 are formed at both sides of the plurality of cells 100, and the two cutters 20 and the two cell tab fixers 30 are formed as described above, the cutter 20b shown in FIGS. 3 to 5 according to the second embodiment can be obviously applied.

According to another embodiment of the present disclosure, the plurality of cells 100 are stacked, and the plurality of tabs 110 on one sides of the stacked cells 100 may be constrained and fixed by the cell tab fixer 30. Thereafter, the plurality of fixed tabs 110 may be cut by once driving of the cutter 20.

Meanwhile, the plurality of the cells 100, while the plurality of cells 100 are stacked, may be fixed each other by an adhesive member, and at this point, the cell body 120 of each of the plurality of stacked cells 100 may be fixed by the cell fixer 50.

Further, the cell tab fixer 30 and the cutter 20 may be transferred so that the cell tab fixer 30 and the cutter 20, which were initially spaced apart from the plurality of cells 100, are transferred to the plurality of tabs 110 such that the plurality of tabs 110 may be fixed to the cell tab fixer 30.

After fixed to the cell tab fixer 30, the plurality of tabs 110 may be sequentially cut in a predetermined direction by the cutter 20a according to the first embodiment of the present disclosure and may be simultaneously cut by the cutter 20b according to the second embodiment of the present disclosure.

Meanwhile, after the plurality of tabs 110 are cut, the cell tab fixer 30 and the cutter 20 may be transferred again and be spaced apart from the plurality of stacked cells 100 such that a space for separating the plurality of stacked cells 100 may be secured and an operator can easily separate the plurality of stacked cells 100 and stack new cells 100.

Further, as described above, the plurality of tabs 110 may also be formed at the other sides of the plurality of stacked cells 100, and the cutters 20 may be simultaneously driven at both sides of the plurality of stacked cells 100 such that the plurality of tabs 110 may be simultaneously cut at both sides of the plurality of stacked cells 100. Alternatively, it will be obvious to those skilled in the art that the cutters 20 may be sequentially driven at both sides of the plurality of stacked cells 100 such that the plurality of tabs 110 may be sequentially cut at both sides of the plurality of stacked cells 100.

Although the multi-cell tab cutting apparatus 1 and the method therefor have been described on the basis of the case in which the plurality of cells 100 are stacked parallel to the ground, even when the plurality of stacked cells 100 are disposed perpendicular to the ground, the cell fixer 50, the cutter 20, and the cell tab fixer 30 may also be modified and disposed horizontal to the ground such that the plurality of tabs 110 may be cut in the same method as described above.

As described above, the embodiments of the present disclosure can cut a plurality of tabs at a time in a state in which cells are stacked, thereby improving the working speed.

Further, since the plurality of tabs are cut in a state of being fixed by a cell tab fixer, the embodiments of the present disclosure can minimize a tolerance between the processed tabs such that quality of a battery module can be significantly improved.

Furthermore, the embodiments of the present disclosure can transfer a cutter and the cell tab fixer so that the stacked cells can be easily separated and transferred after the stacked cells are cut.

Although the present disclosure has been described by way of representative embodiments thereof, it should be understood that numerous modifications can be devised by those skilled in the art that fall within the spirit and scope of the principles of this disclosure with respect to the described embodiments. Therefore, the scope of the present disclosure should not be limited to the described embodiments, and it should be determined by not only the appended claims but also equivalents to which such claims are entitled.

What is claimed is:

1. A multi-cell tab cutting apparatus for a plurality of stacked cells, which have a plurality of tabs formed at one side, the apparatus comprising:
   a base frame;
   a cell fixer configured to fix cell bodies of the plurality of stacked cells so that the plurality of tabs are spaced at predetermined intervals;
   at least one cell tab fixer having a plurality of fixing recesses formed at the predetermined intervals so that the plurality of tabs of the plurality of cells are inserted and fixed, respectively,
   at least one cutter configured to cut the fixed plurality of the tabs while maintaining the predetermined intervals of the plurality of the tabs, and
   the at least one cutter includes a cutting member having a plurality of cutting recesses, each tab of the plurality of tabs is disposed within a corresponding cutting recess and the tabs are simultaneously cut during driving of the cutting member.

2. The apparatus of claim 1, further comprising a slider configured to rectilinearly drive the cutter.

3. The apparatus of claim 1, wherein the at least one cell tab fixer includes a first fixer and a second fixer which are spaced apart from each other.

4. The apparatus of claim 3, wherein:
   the at least one cutter includes a cutting blade at one side, and
   the cutting blade is inserted into a space between the first fixer and the second fixer to sequentially cut the plurality of tabs in a predetermined direction.

5. The apparatus of claim 1, further comprising a transferer configured to transfer the at least one cutter and the cell tab fixer.

6. The apparatus of claim 1, wherein:
a plurality of tabs are formed at both sides of each of the plurality of stacked cells, and
at least two cutters and at least two cell tab fixers are located at each of both sides of the plurality of stacked cells.

7. The apparatus of claim 1, wherein:
the at least one cutter cuts the plurality of tabs through driving once.

8. A multi-cell tab cutting method, comprising:
fixing a plurality of stacked cells to a cell fixer provided in a base frame so that a plurality of cell tabs of the plurality of stacked cells are spaced at a predetermined interval;
inserting and fixing the plurality of cell tabs the plurality of stacked cells to a plurality of fixing recesses formed at the predetermined interval of a cell tab fixer, respectively;
providing a cutting member;
inserting each fixed cell tab of the plurality of cell tabs into a corresponding recess provided on the cutter member and simultaneously cutting the plurality of fixed cell tabs while maintaining the predetermined intervals of the plurality of fixed cell tabs.

9. The method of claim 8, further comprising fixing a cell body of each of the plurality of stacked cells by a cell fixer.

10. The method of claim 8, further comprising sequentially cutting the plurality of tabs in a predetermined direction.

11. The method of claim 8, further comprising transferring the cell tab fixer and the cutter to approach toward the plurality of stacked cells or to separate from the plurality of stacked cells.

12. The method of claim 8, wherein a plurality of tabs are formed at both sides of each of the plurality of stacked cells, and the cutter is driven at both sides of the plurality of stacked cells.

* * * * *